United States Patent
Otsu et al.

(10) Patent No.: US 7,924,168 B2
(45) Date of Patent: Apr. 12, 2011

(54) REMOTE CONTROL SYSTEM, REMOTE COMMANDER AND REMOTE CONTROL METHOD, APPARATUS TO BE REMOTELY CONTROLLED, AND COMPUTER SYSTEM

(75) Inventors: Shuichi Otsu, Kanagawa (JP); Junichi Nakamura, Chiba (JP); Hideki Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1378 days.

(21) Appl. No.: 11/417,147

(22) Filed: May 4, 2006

(65) Prior Publication Data
US 2006/0251059 A1     Nov. 9, 2006

(30) Foreign Application Priority Data

May 9, 2005 (JP) ................................. 2005-135656
Jan. 11, 2006 (JP) ................................. 2006-004130

(51) Int. Cl.
G08C 19/00 (2006.01)
G05B 19/02 (2006.01)
G06F 7/00 (2006.01)
G08B 13/00 (2006.01)

(52) U.S. Cl. ......... 340/825.72; 340/825.69; 340/825.22; 340/5.3; 340/7.22

(58) Field of Classification Search ............ 340/825.72, 340/825.69, 825.22, 5.3, 5.32, 7.22; 341/176; 382/103; 386/124; 725/98, 109; 714/31
See application file for complete search history.

(56) References Cited

U.S. PATENT DOCUMENTS

| 5,489,894 | A | * | 2/1996 | Murray | 340/7.32 |
| 6,590,504 | B1 | * | 7/2003 | Hermann | 340/825.69 |
| 7,136,709 | B2 | * | 11/2006 | Arling et al. | 700/65 |
| 7,155,305 | B2 | * | 12/2006 | Hayes et al. | 700/224 |
| 2004/0155809 | A1 | * | 8/2004 | Eyer | 341/176 |

FOREIGN PATENT DOCUMENTS

| JP | 10-155188 | 6/1998 |
| JP | 2001-128262 | 5/2001 |
| JP | 2001-309457 | 11/2001 |
| JP | 2003-209896 | 7/2003 |
| JP | 2003-230183 | 8/2003 |
| JP | 2003-324780 | 11/2003 |
| JP | 2004-138275 | 5/2004 |

* cited by examiner

Primary Examiner — Brian A Zimmerman
Assistant Examiner — Nam V Nguyen
(74) Attorney, Agent, or Firm — Oblon, Spivak, McClelland, Maier & Neustadt, L.L.P.

(57) ABSTRACT

When apparatuses controllable via a network exist inside and outside a user's visual range, a user remotely controls at least one of the apparatuses via the network using a predetermined control point in a remote control system. The remote control system includes the following: a mechanism that causes the control point to transmit a command for specifying an apparatus to be controlled via the network to an apparatus to be specified in accordance with a user's apparatus specifying operation; and a mechanism that causes the apparatus that has received the command for specifying an apparatus to be controlled to transmit a response via the network to the control point as well as to perform an operation using a device attached to the body of the apparatus in response to the command.

14 Claims, 9 Drawing Sheets

REMOTE CONTROL SYSTEM, REMOTE COMMANDER AND REMOTE CONTROL METHOD, APPARATUS TO BE REMOTELY CONTROLLED, AND COMPUTER SYSTEM

CROSS REFERENCES TO RELATED APPLICATIONS

The present invention contains subject matter related to Japanese Patent Applications JP 2005-135656 and 2006-004130 filed in the Japanese Patent Office on May 9, 2005 and Jan. 11, 2006, respectively, the entire contents of which are incorporated herein by reference.

BACKGROUND OF THE INVENTION

1. Field of the Invention

The present invention relates to remote control systems, remote commanders and remote control methods, apparatuses to be remotely controlled, and computer systems for remotely controlling television receivers, DVD players, other various AV and CE apparatuses, information apparatuses, etc. using the remote commanders. In particular, the present invention relates to remote control systems, remote commanders and remote control methods, apparatuses to be remotely controlled, and computer systems for achieving remote control freed from the constraints of directivity and transmittable distance from the remote commander to the apparatus to be controlled.

More particularly, the present invention relates to a remote control system, a remote commander and remote control method, an apparatus to be remotely controlled, and a computer system for enabling interactive communication between the remote commander and the apparatus to be controlled using a network based on TCP/IP or the like. In particular, the present invention relates to a remote control system, a remote commander and remote control method, an apparatus to be remotely controlled, and a computer system for performing a remote control operation upon an apparatus in front of a user, the apparatus having been selected so as to be operated from among a plurality of apparatuses freed from the constraints of directivity and transmittable distance.

2. Description of the Related Art

At present, various home information appliances such as television receivers, video recording and reproducing apparatuses, and audiovisual apparatuses have been developed and manufactured, and have been widely used at home or in other living spaces. Basically, these information appliances are directly operated by means of user interfaces provided thereto. In addition, almost all information appliances are currently configured to be remotely operated by remote controllers.

In the field of consumer-oriented electric and electronic apparatuses such as home appliances, for example, infrared remote controllers adopting an amplitude modulation scheme have been developed as means for enabling users to remotely input operation commands into the apparatuses and have already become popular. A communication method using infrared rays has advantages of being inexpensive, consuming little electricity, being freed from legal restraints in every country, etc. This communication method does not need wiring, namely, does not need a connector for connecting cables, thereby leading to cost reduction. Moreover, the apparatuses are freed from mechanical wear due to the attachment/removal of the connectors thereto/therefrom for connection/disconnection.

However, the communication method using infrared rays has a problem of directivity. When the light receiving portion of a receiver is not directed in the range of a viewing angle of a transmitter, communication cannot be established. This becomes a large constraint (see, for example, Japanese Unexamined Patent Application Publication No. 2002-165281). Since the infrared communication method basically is a one-way communication method, a transmitter cannot receive a reply from a receiver, namely, cannot confirm the result of the transmission.

Home networks for interactively connecting home information appliances are currently penetrating the home market. For example, DLNA (the Digital Network Living Alliance) proposes a seamless and interactively connectable network system in which users can easily and conveniently enjoy contents at any location in a house using any home appliances (see, for example, the website of DLNA). According to this system, information such as AV content may be stored in any apparatuses on a network. That is, a user can watch the AV content not only in the room where an apparatus storing the content exists but also in other rooms separated from the above-mentioned room irrespective of the storage location of the content, whereby convenience for the user can be enhanced.

It can be expected that these apparatuses adapted to the DLNA guideline will be more widely used, and more and more apparatuses will be supported for networks. When the number of network-ready apparatuses is increased, remote control of these apparatuses, which has been performed using infrared communication, can be performed by means of a control point (hereinafter also referred to as an "IP remote controller"). The IP remote controller controls apparatuses on a network using an IP network that has few constraints of directivity and communication range (see, for example, Japanese Application No. 2005-17439 that has been assigned to the applicant of the present invention).

In the case of an infrared remote controller, when an apparatus to be controlled is not directed in the range of a viewing angle of the infrared remote controller, the apparatus cannot be operated owing to the constraint of directivity. Conversely, the apparatus to be controlled can be easily specified and be visually checked. In contrast, in a case where apparatuses are controlled by an IP remote controller, when a user wants to control an apparatus in front of him or her, the user has to go to the trouble of specifying the apparatus, because not only the apparatus in front of him or her but also other apparatuses can typically be controlled.

Figure 8:
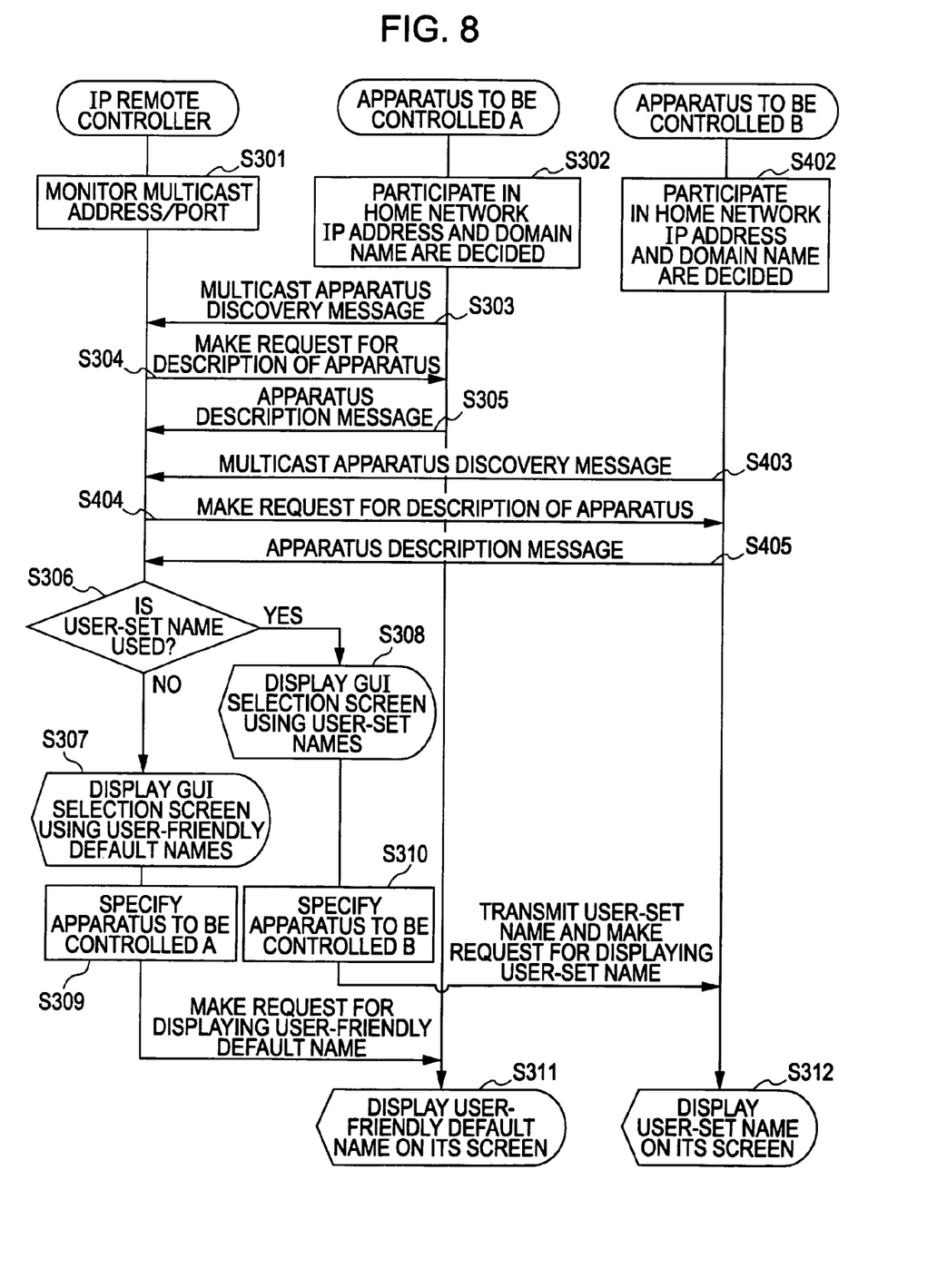
FIG. 8 is a diagram showing an operating sequence of specifying an apparatus to be controlled using a user-friendly default or user-set name and confirming the specified apparatus to be controlled.

In a case where a plurality of controllable apparatuses exist on a network, an apparatus to be controlled can be specified in accordance with the following process that uses interactivity of network communication: the IP remote controller transmits a predetermined command on the network; it is determined whether a response is transmitted from any of the apparatuses on the network; and the determined result is displayed on a GUI (Graphical User Interface) of the IP remote controller (see, for example, Japanese Unexamined Patent Application Publication No. 2003-330827, FIG. 8). However, it cannot be determined whether the apparatus displayed on the GUI is truly the apparatus that a user wants to control at this time. Whether the desired apparatus to be controlled has been correctly specified can be determined only after the IP remote controller transmits a command that makes a request to perform an operation to the apparatus displayed on the GUI, and then the requested operation is performed by the apparatus.

When a list of apparatuses each of which having transmitted a response to the command is displayed, a user can understand the currently available apparatuses and easily select one of the apparatuses on a selection screen. However, when all apparatuses on the network are listed on the selection screen, it is difficult for the user to specify the apparatus in front of him or her.

SUMMARY OF THE INVENTION

It is desirable to provide an excellent remote control system, remote commander and remote control method, apparatus to be remotely controlled, and computer system that enable interactive communication between the remote commander and an apparatus to be operated using an IP network.

It is further desirable to provide an excellent remote control system, remote commander and remote control method, apparatus to be remotely controlled, and computer system that enable a user to perform a remote control operation upon an apparatus in front of him or her, the apparatus having been selected so as to be operated from among a plurality of apparatuses freed from constraints of directivity and communication range.

It is still further desirable to provide an excellent remote control system, remote commander and remote control method, apparatus to be remotely controlled, and computer system that enable a user to easily specify a desired apparatus to be controlled and then perform a remote control operation upon the specified apparatus when a plurality of controllable apparatuses exist on a network.

According to an embodiment of the present invention, there is provided a remote control system in which, when apparatuses controllable via a network exist inside and outside a user's visual range, a user remotely controls at least one of the apparatuses via the network using a predetermined control point, the remote control system including the following: a mechanism that causes the control point to transmit a command for specifying an apparatus to be controlled via the network to an apparatus to be specified in accordance with a user's apparatus specifying operation; and a mechanism that causes the apparatus that has received the command for specifying an apparatus to be controlled to transmit a response via the network to the control point as well as to perform an operation using a device attached to the body of the apparatus in response to the command.

Here, the above-described "system" means a logical group of a plurality of apparatuses (or functional modules for achieving a predetermined function). Each apparatus and functional module may or may not be in a single cabinet (same hereinafter).

When network-ready AV apparatuses are connected to each other, a user can seamlessly use these AV apparatuses on a home network. As more and more AV apparatuses are supported so as to become network-ready apparatuses, a remote control operation using an IP network that has few constraints of directivity and communication range can be performed. An IP remote controller used in such a remote control operation is configured to interactively communicate with an AV apparatus to be operated. Therefore, according to the IP remote controller, the following effects can be achieved: the enablement of reliable communication by performing transmission confirmation; capability of handling of a complicated command system by adopting a GUI operation; and capability of transmission of very large amounts of data intended for, for example, streaming distribution of moving images, by using a relatively wide band.

A remote control system using the IP remote controller can be implemented by the following exemplary configuration: the IP remote controller transmits a command as a wireless LAN signal; an access point receives the command and then transfers the received command to an AV apparatus via a wire LAN; the AV apparatus transmits a content and information; and the access point receives the content and information and transmits it to the IP remote controller.

The IP remote controller can be freed from a constraint of directivity that infrared remote controllers have. On the other hand, however, when a user uses the IP remote controller, he or she cannot easily specify an apparatus to be controlled in front of him or her in a visual observation manner, because not only the apparatus in front of the user but also other apparatuses can typically be controlled. For example, the following cases can be imagined: when a plurality of apparatuses exist both inside and outside a user's visual range, the user wants to specify and control the apparatus that exists inside the user's visual range; and when a plurality of the same kinds of apparatuses are disposed inside a user's visual range, the user wants to specify and control only one of these apparatuses.

In the remote control system according to an embodiment of the present invention, an IP network is used for command transmission from the IP remote controller that functions as a control point and for response transmission from an apparatus to be controlled. When the apparatus to be controlled responds, in addition to the response transmission via the IP network, an operation depending on the device attached to the apparatus body is also performed. For example, image output on a display device, light flashing from an LED, or sound output from a speaker is performed on the body of an actually specified apparatus. Accordingly, since a user can visually check the above-described operation performed by the device attached to the apparatus in front of him or her, he or she can determine whether the desired apparatus has been correctly specified.

A procedure for specifying an apparatus to be controlled and confirming the specified apparatus to be controlled is as follows: (1) the IP remote controller transmits a command for specifying an apparatus to be controlled to an apparatus to be specified via a network; (2) the apparatus having received the command transmits a response to the IP remote controller via the network as well as performs a response operation that depends on a device attached to the apparatus body, the response operation such as displaying of an icon showing that it has been specified as an apparatus to be controlled, flashing of an LED attached to the panel of its body, beep sound generation, or vibration of its body; and (3) the user in front of the apparatus detects the response operation. Conversely, if the user is not in front of the apparatus, he or she cannot detect the response operation. Thus, the user can actually determine whether the desired apparatus has been correctly specified.

When the user has succeeded in performing an apparatus specifying operation via the IP remote controller, the apparatus in front of him or her performs an operation such as displaying of an icon or a message, or generation of beep sound or a sound message. Therefore, the user can directly confirm that he or she has successfully specified the desired apparatus.

On the other hand, in a case where the IP remote controller incorrectly transmits a command for specifying an apparatus to be controlled to a different apparatus, the apparatus having received the command gives a reaction together with an operation. If the apparatus is disposed in the same room where a user exists, the user can directly confirm that he or she has failed to correctly specify an apparatus from the operation performed by the undesired apparatus. If the apparatus having been incorrectly specified is disposed in a different room, the user cannot see the response together with an operation from any apparatuses in the room where he or she is. Accordingly, the user can still confirm that he or she has failed to specify the desired apparatus.

An apparatus specifying operation using an easy-to-understand user-set or user-friendly default name given to each apparatus to be remotely controlled on a network may be performed.

In this case, the IP remote controller (or an access point between an IP remote controller and a network) has a table of network identification information such as the IP address, and a user-set or user-friendly default name, all of which are associated with an apparatuses to be remotely controlled. The user-friendly default name stored in each apparatus to be remotely controlled is initially set by a manufacturer and may be changed to the user's liking. The IP remote controller can acquire the user-friendly default name via a network. The user-set name means a mnemonic name that a user can freely give to an apparatus and is stored in the IP remote controller.

The IP remote controller provides a GUI selection screen on which a list of a user-friendly default or user-set name given to each of apparatuses controllable via a network is displayed. In response to a user's apparatus specifying operation through the screen, the IP remote controller transmits a command for specifying an apparatus to be controlled to the apparatus having been selected by the user. The command includes a request for displaying a user-friendly default or user-set name.

Upon receiving the command, an apparatus to be remotely controlled displays its user-friendly default or user-set name on a screen thereof as an operation. According to the above-described process, a user can compare the apparatus name that he or she has selected on the GUI selection screen to the apparatus name displayed on the screen of the actually specified apparatus to be remotely controlled on the basis of the contents of both screens. In particular, when the user-set name that is easier to understand for users is used, the display of the user-set name is more acceptable and understandable for users compared with the reaction of LED indication or beep sound generation.

According to an embodiment of the present invention, there is provided a computer program written in a computer-readable form so that processing for remotely operating via a network at least one of one or more apparatuses that are controllable via the network and are connected to each other via the network can be performed on a computer system, the at least one of one or more apparatuses having been specified as an apparatus to be controlled by a user, the computer program causing the computer system to execute: a procedure for informing a user of the one or more apparatuses controllable via the network; a procedure for specifying an apparatus by transmitting a command for specifying an apparatus via the network to an apparatus that a user has specified from among the one or more apparatuses that the user has been informed of; and a procedure for informing a user that an apparatus specifying operation has been completed upon receiving a reception confirmation response via the network from an apparatus to which the command for specifying an apparatus has been transmitted, the reception confirmation response showing that the apparatus has accepted the command.

A computer program according to an embodiment of the present invention is defined as a computer program that is written in a computer-readable form so that predetermined processing can be achieved on a computer system. That is, when a computer program according to an embodiment of the present invention is installed in a computer system, a cooperative action is performed, whereby the computer system can operate as a control point in the remote control system according to an embodiment of the present invention.

Other objects, characteristics, and advantages of the present invention will become apparent from more detailed descriptions based on the following embodiment of the present invention and the accompanying drawings.

DESCRIPTION OF THE PREFERRED EMBODIMENT

An embodiment of the present invention will be described in detail with reference to the accompanying drawings.

Figure 1:
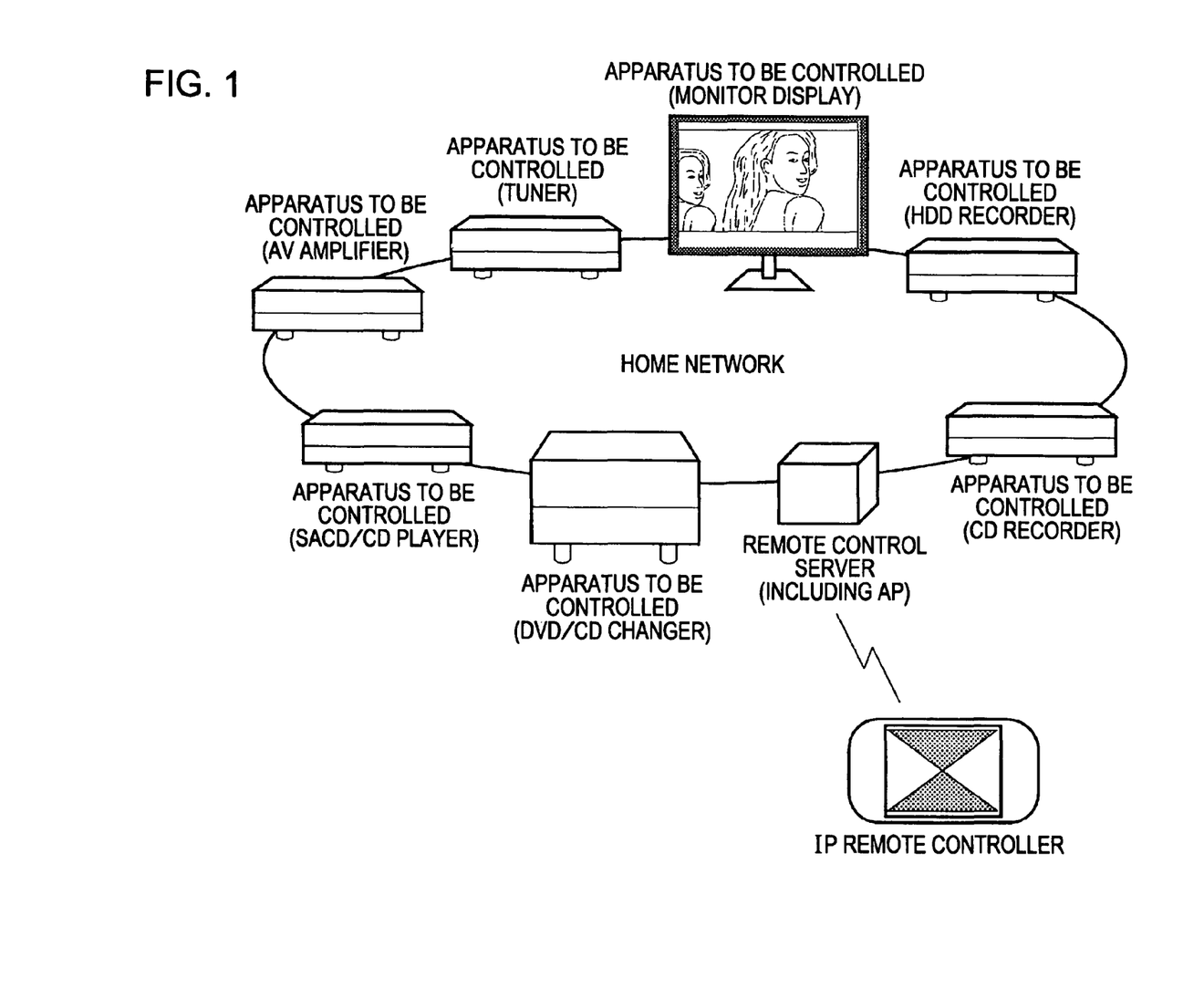
FIG. 1 is a schematic diagram of an exemplary home network to which an embodiment of the present invention is applied.

FIG. 1 is a schematic diagram of an exemplary home network to which an embodiment of the present invention is applied.

In the home network shown in the drawing, a remote control system is provided where a remote commander, i.e., IP remote controller, that uses an IP network instead of (or in addition to) an infrared transmission line is used.

Apparatuses to be controlled by the IP remote controller are, for example, as follows: a content playback apparatus such as a monitor display for playing back AV contents or a sound reproducing apparatus (an AV amplifier); a content providing apparatus such as a tuner for receiving broadcast contents and providing the received broadcast contents on a home network or a CD/DVD player for providing contents stored in a medium; and a content recording apparatus for recording externally obtained contents such as broadcast contents. The content playback apparatus, content providing apparatus, and content recording apparatus are individually provided with a function of receiving an infrared command as well as a network interface. These apparatuses are interactively connected to each other via an IP network (LAN) constructed in accordance with the IEEE 802.3 (Ethernet) standard. An example of an apparatus to be controlled that the IP remote controller can operate using commands via a network is a home appliance compliant with the DLNA guideline (hereinafter also referred to as a DLNA apparatus).

The IP remote controller is provided with a function of transmitting an infrared command corresponding to a user's operation as well as a wireless network interface, thereby enabling communication with an access point (AP) via a wireless network constituted in accordance with the IEEE 802.11a/b/g standard. Since AP is connected to an IP network, the IP remote controller can interactively communicate with each DLNA apparatus to be controlled via AP. Accordingly, the IP remote controller can transmit a remote control command to the DLNA apparatus via the IP network and can receive data from a desired apparatus to be controlled.

According to the IP remote controller, a remote control operation can be performed using a communication medium that has few constraints of directivity and communication range. Since the IP remote controller and an apparatus to be operated can interactively communicate with each other via the IP network, the following technical effects can be obtained: (1) the enablement of reliable communication by performing transmission confirmation (receiving a response); (2) capability of handling of a complicated command system by adopting a GUI operation; and (3) capability of transmission of very large amounts of data intended for, for example, streaming distribution of moving images, by using a relatively wide band.

For example, a television receiver configured to be operated by the IP remote controller distributes received moving image data to the IP remote controller via the IP network. A user can watch the distributed moving image on a display screen of the IP remote controller, the display screen functioning as a subscreen of the screen of the television receiver (see, for example, the above-mentioned Japanese Patent Application No. 2005-17439)

Referring to the system shown in FIG. 1, a remote control server exists between the IP remote controller and the DLNA apparatuses to be controlled. The remote control server is provided with an access point function on a wireless network. The remote control server and a DLNA apparatus such as a television receiver to be controlled by the IP remote controller are configured in an integrated manner. Furthermore, the remote control server is also provided with a wired LAN communication function such as Ethernet. The remote control server receives an operation command from the IP remote controller via the IP network, i.e., a LAN and then transfers the operation command to the apparatus to be controlled by the IP remote controller, and, in contrast, wirelessly transfers contents such as moving image data having been received from the DLNA apparatus to the IP remote controller. In a case where the apparatus to be controlled is also provided with the LAN communication function, the remote control server transfers an operation command having been wirelessly received from the IP remote controller to the apparatus via a LAN. However, since the remote control server is not directly concerned with the gist of the present invention, the additional description thereof will be omitted.

Figure 2:
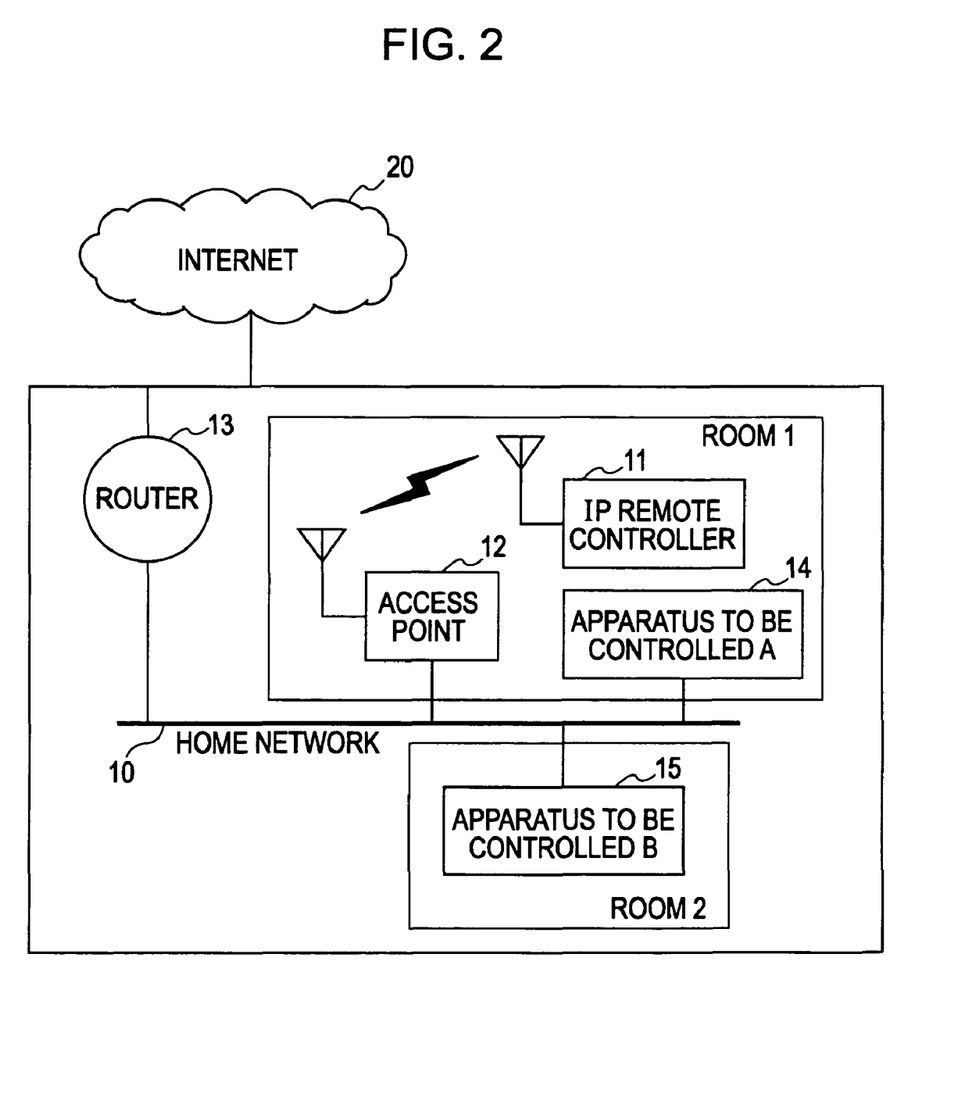
FIG. 2 is a diagram showing a situation in which controllable apparatuses exist both inside and outside a user's visual range.

When a plurality of apparatuses are controlled by the IP remote controller in the above-described home network configuration, the plurality of controllable apparatuses may exist both inside and outside a user's visual range. FIG. 2 is a diagram showing a situation in which controllable apparatuses exist both inside and outside a user's visual range.

A home network 10 is connected to the Internet 20 via a router 13. The router 13 is connected to an access point 12 for a wireless LAN, and apparatuses to be controlled A 14 and B 15. An IP remote controller 11 is connected to the home network 10 via the access point 12.

There are separate rooms 1 and 2 in a house shown in this drawing. The access point 12, the apparatus to be controlled A 14, and the IP remote controller 11 are disposed in the room 1. The apparatus to be controlled B 15 is disposed in the room 2. That is, the apparatuses to be controlled A 14 and B 15 exist inside and outside a user's visual range, respectively. In the following description, it will be assumed that a user wants to specify the apparatus A 14 inside the user's visual range and performs a remote control operation upon the specified apparatus A 14.

Figure 3:
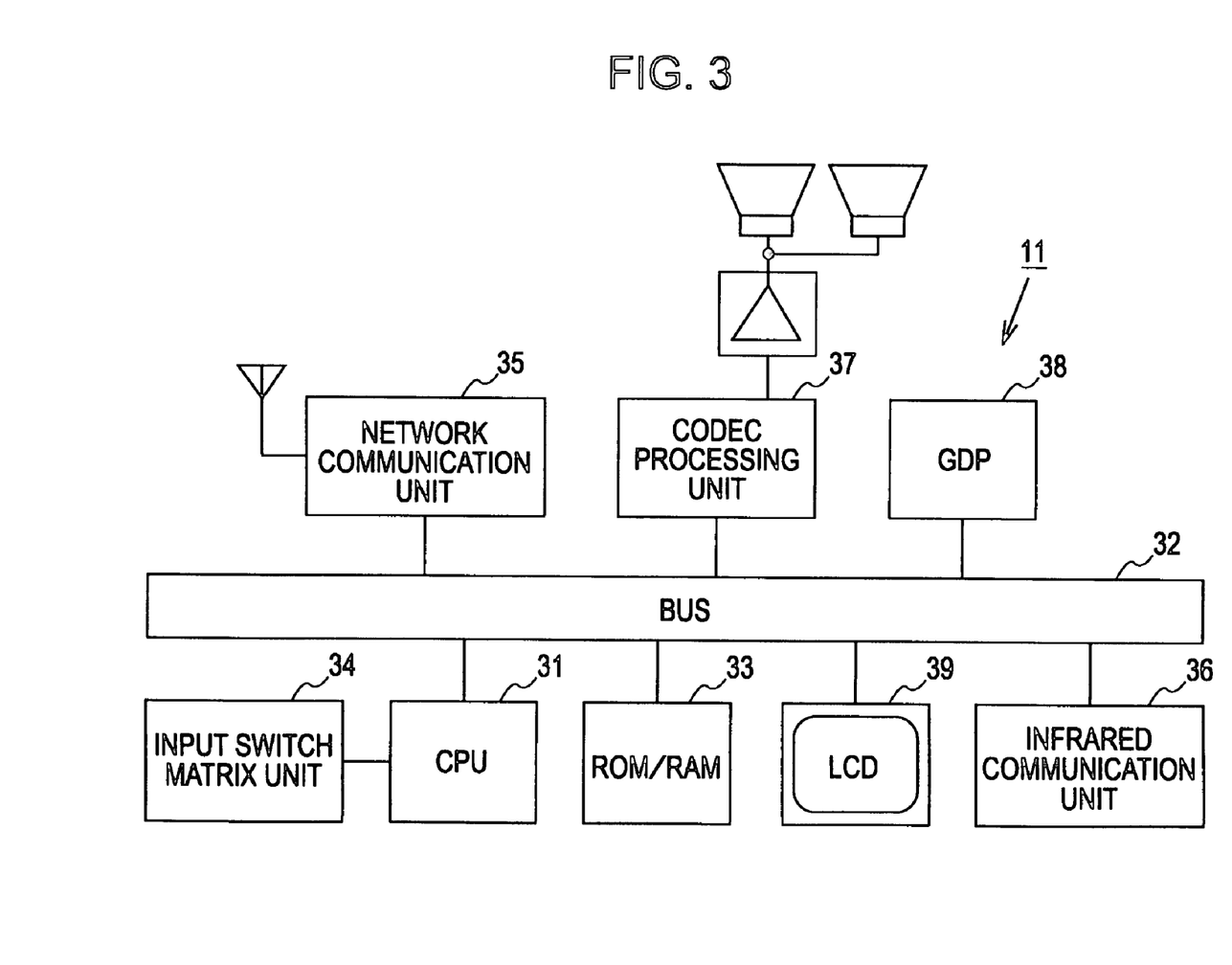
FIG. 3 is a block diagram showing an exemplary hardware configuration of a terminal apparatus operable as an IP remote controller.

FIG. 3 is a block diagram showing an exemplary hardware configuration of a terminal apparatus operable as an IP remote controller in a remote control system according to this embodiment. The terminal apparatus shown in this drawing may be produced as a terminal dedicated to the IP remote controller, or may be designed as a multifunctional apparatus that combines the functions of the IP remote controller and another portable terminal such as a PDA (Personal Digital Assistant), a game machine, or a mobile phone.

The shown IP remote controller 11 is configured so that a CPU (Central Processing Unit) 31 can centrally control each unit via a bus 32.

The CPU 31 is provided with a memory unit 33 that includes a ROM and a RAM. The CPU 31 decompresses a program code stored on the ROM onto the RAM and then performs predetermined processing. The predetermined processing includes the following: sending/receiving a command/response to/from an apparatus to be controlled as a control signal via a network; sending/receiving a content to/from an apparatus to be controlled; transferring a file; and remotely controlling an apparatus to be controlled such as a DLNA apparatus or an IR apparatus. The CPU 31 executes these processing steps in accordance with an instruction input by a user.

An input switch matrix unit 34 includes a key operation portion for facilitating operation of a numerical keypad, a sound control key, an image quality control key, and a channel selection key. The input switch matrix unit 34 is configured so that a user can input an operational instruction for an apparatus to be remotely controlled. The operation command for an apparatus to be controlled, which has been input on the input switch matrix unit 34, is transmitted from a network communication unit 35 to the apparatus to be controlled via the IP network.

The network communication unit 35 is provided with a network interface for communicating with an access point (AP) via a wireless network constructed in accordance with, for example, the IEEE 802.11a/b/g standard. Unique identification information on a network such as MAC and IP addresses is given to the network communication unit. In this embodiment, the network communication unit 35 is configured to transfer a remote control request corresponding to the instruction having been input by means of the input switch matrix unit 34 to an apparatus to be controlled via a network.

An infrared communication unit 36 is configured to transmit a device discovery request as an infrared signal intended for specifying an apparatus in front of a user that has the IP remote controller. The infrared communication unit 36 may be provided with a function of transmitting a general infrared command by adopting SIRCS (Serial Infrared Remote Control System) which is an infrared communication standard widely applied to remote controllers of AV apparatuses, etc. However, the infrared communication unit 36 is not essential subject matter of the present invention.

A codec processing unit 37 performs encoding and decoding processing of AV contents. In this embodiment, an AV content such as MPEG-4 data having transmitted from the DLNA apparatus to be controlled is received by the network communication unit 35 and is then decoded by the codec processing unit 37, whereby sound and video can be played back. A television receiver to be operated by the IP remote controller, for example, can distribute received moving image data to the IP remote controller via the IP network. A user can watch the distributed moving image on a display screen of the IP remote controller, the display screen functioning as a sub-screen of the screen of the television receiver. In a case where the IP remote controller does not transmit AV contents, the encoding function of the codec processing unit 37 is not required.

A graphic display processor (GDP) 38 performs processing of drawing data to be output to a liquid crystal display unit (LCD) 39, drive control of the liquid crystal display unit 39, and processing of data having been input by a user by means of a display screen of the liquid crystal display unit 39, the display screen doubling as a touch panel. For example, a video signal having been decoded by the codec processing unit 37 is output to the liquid crystal display unit 39 by the graphic display processor 38. Moreover, on the basis of apparatus information acquired from an apparatus to be controlled that is connected to a network, the graphic display processor 38 displays a user interface for operating the apparatus on the liquid crystal display unit 39.

Figure 4A:
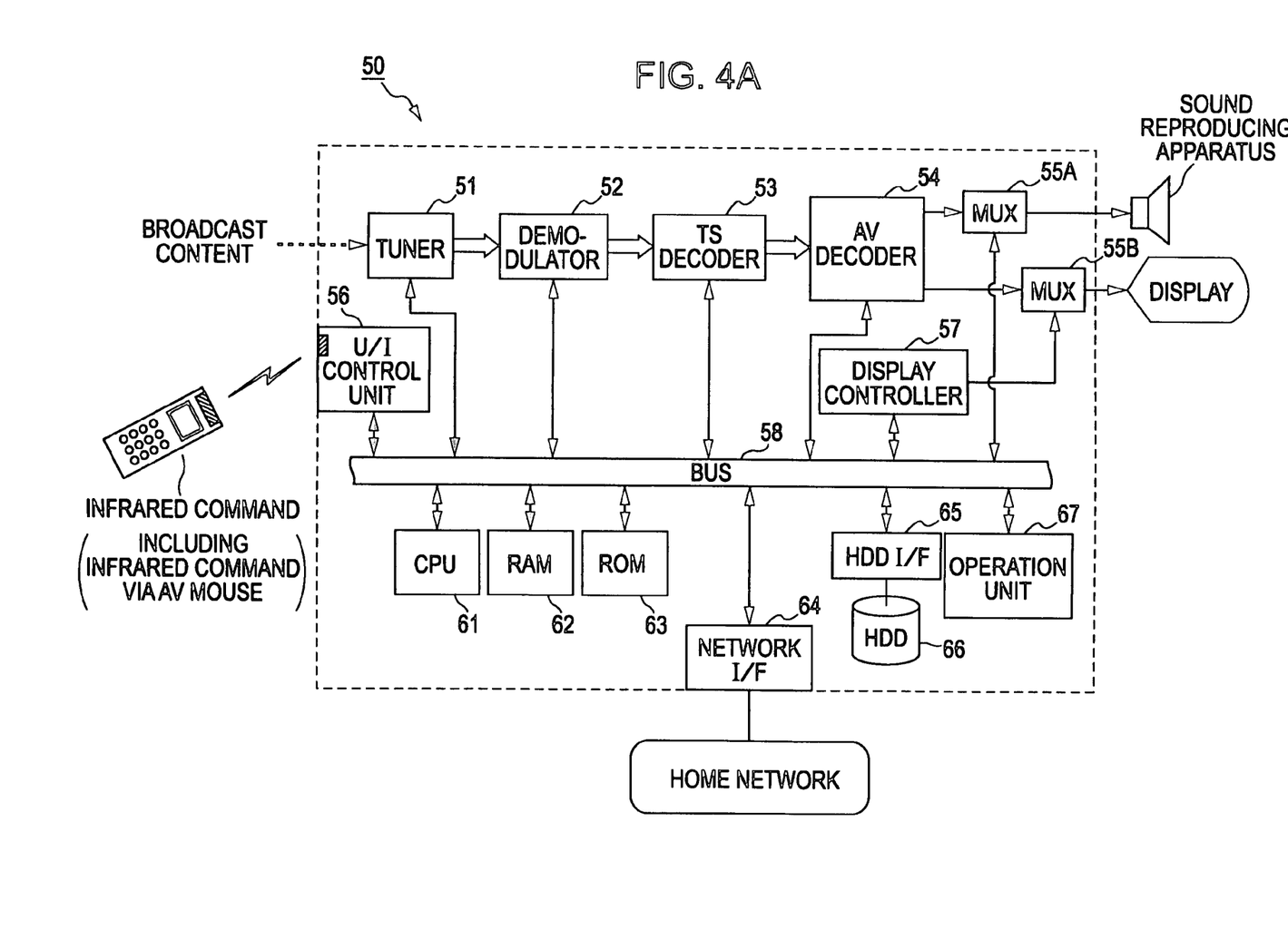
FIG. 4A is a block diagram showing a configuration of an apparatus that operates as an apparatus to be controlled.

FIG. 4A is a block diagram showing a configuration of an apparatus that operates as an apparatus to be controlled in a remote control system according to this embodiment. In the example shown in this drawing, the apparatus to be controlled functions as a network (or DLNA)-ready hard disk recorder that selects and records broadcast contents such as television broadcasts.

Figure 4B:
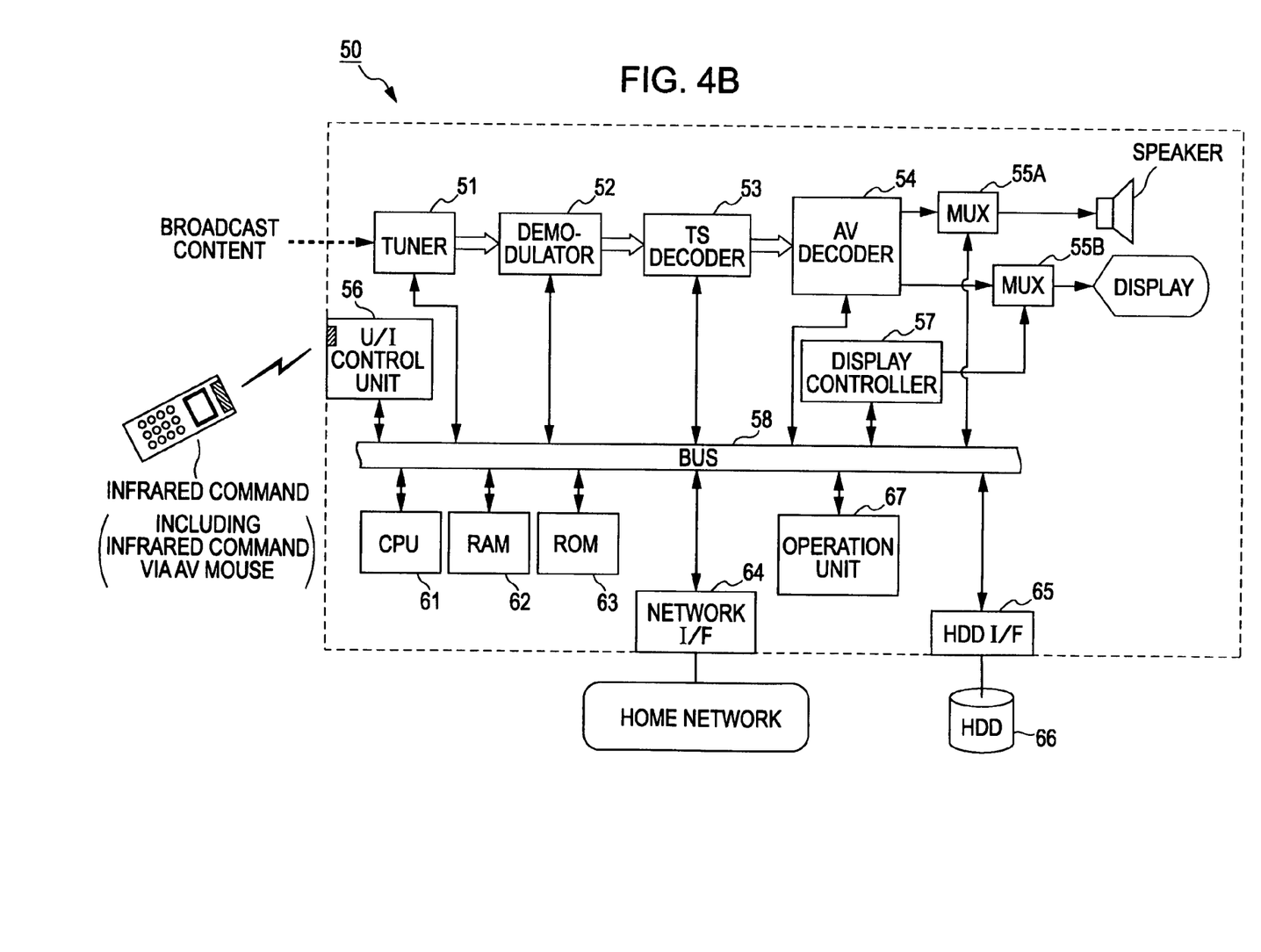
FIG. 4B is a block diagram showing a configuration of an apparatus that operates as an apparatus to be controlled.

Alternatively, referring to FIG. 4B, the apparatus to be controlled functions as a television receiver that is connected to an external hard disk drive 66 via an external port of a hard disk interface 65 and that is provided with a display and a speaker.

A broadcast wave having been received by an antenna (not shown) is supplied to a tuner 51. The tuner 51 selects a broadcast wave in a predetermined channel in accordance with an instruction by the CPU 61 and then outputs received data to a demodulator 52 at a subsequent stage. The demodulator 52 demodulates the received digital modulated data.

The demodulated digital data is, for example, a transport stream (TS) in which AV data having been compressed in accordance with the MPEG-2 system and program information are multiplexed. A TS decoder 53 interprets the transport stream and then separates the transport stream into the AV data having been compressed in accordance with the MPEG-2 system and program information. Subsequently the TS decoder 53 transmits the AV data to an AV decoder 54 and transmits the program information to the CPU 61 via a bus 58.

Upon receiving the real time AV data having been compressed in accordance with the MPEG-2 system from the TS decoder 53, the AV decoder 54 separates the AV data into compressed video data and compressed audio data. The compressed video data is decompressed into an original video signal in accordance with the MPEG-2 system by the AV decoder 54. The audio data is PCM (Pulse Code Modulation)-decoded and is then synthesized with additive sound into an audio signal to be played back. The video signal to be played back is output on a display via a multiplexer 55B. The audio signal to be played back is output to a sound reproducing apparatus via a multiplexer 55A. In the case of a broadcast content of a program programmed to be recorded, the compressed video and audio data are not decompressed. These data are transferred to the hard disk drive 66 via the bus 58 and are then temporarily recorded on the hard disk drive 66. When the broadcast content is watched, these data are read out from the hard disk drive 66 and are then decompressed by the AV decoder 54, whereby the broadcast content is played back.

A user interface control unit 56 functions as a module for performing processing of input operations by users. The user interface control unit 56, for example, is provided with a key matrix (not shown) including operation buttons/switches intended for users' manual operations, and a function of receiving an infrared remote control command. A user can perform content-related operations such as broadcast program selection, recording, recording programming, reproducing, and recorded program deleting using a remote controller via the user interface control unit 56.

The CPU 61 functions as a main controller that controls all operations of a content providing apparatus 50. The CPU 61 performs processing of recording, recording programming, reproducing, etc. of a broadcast program in response to a remote control command having been received from the IP remote controller 11 via a network or a command having been received from an infrared remote controller.

A RAM 62 is a writable volatile memory used for loading an execution program code for the CPU 61 and writing activity data of the execution program. A ROM 63 is a read-only memory for permanently storing a self-diagnostic program and/or an initialization program executed upon power-up of a content providing apparatus 50 and a microcode for a hardware operation. The ROM 63 may be, for example, an EEPROM that can electrically erase and rewrite stored data.

A network interface 64 functions as an apparatus that connects the content providing apparatus 50 to an IP network such as a home network. The network interface 64 performs LAN communicating operations in accordance with a communication protocol such as Ethernet.

The hard disk drive (HDD) 66 functions as an external memory for storing a program, data, etc. in a predetermined file format and has a relatively large capacity of, for example, a few dozen to a few hundred GB. The hard disk drive 66 is connected to the bus 58 via the hard disk interface 65.

A display controller 57 functions as a controller dedicated to performing a display control operation upon broadcast program information of a data-broadcast content.

An operation unit 67 is configured with a display device, an LED, a speaker, etc. attached to the apparatus body. Upon receiving a specifying command (described later) from the IP remote controller 11 via a network, the operation unit 67 gives a reaction together with an operation such as displaying of an image, e.g., an icon or a message, flashing of light, or response by means of beep sound or a voice message, thereby causing a user to confirm that he or she has specified the content providing apparatus 50.

Alternatively, in response to a request from the IP remote controller, an apparatus to be controlled may perform an operation such as displaying of the apparatus's name information such as a user-friendly default or user-set name on a display thereof instead of the operation of the operation unit 67. However, this is acceptable only when the apparatus to be controlled is a television receiver or another apparatus that has a display unit (described later). In particular, when an easy-to-understand user-set name is used as the name information, the operation is more acceptable for users compared with a reaction such as LED indication or beep sound generation. In addition, this leads to a more understandable system for users.

In a network-based remote control system, a plurality of apparatuses to be controlled can be controlled by the IP remote controller. Here, as already described with reference to FIG. 2, it can be assumed that the plurality of apparatuses to be controlled exists both inside and outside a user's visual range. In this case, a user may want to specify and control the apparatus that exists inside the user's visual range. In a case where a plurality of same kinds of apparatuses are disposed inside a user's visual range, the user may want to specify and control only one of these apparatuses. However, since the IP remote controller controls the apparatuses on a network as a control point, the controller can typically control not only the apparatus in front of the user but also the other apparatuses. Accordingly, when the IP remote controller is used, the apparatus to be controlled in front of a user cannot be easily specified in a visual observation manner.

In the remote control system according to this embodiment, an IP network is used for command transmission from the IP remote controller and response transmission from an apparatus to be controlled. When the apparatus to be controlled performs a response operation, in addition to the response transmission via the IP network, an operation depending on the device (i.e., the operation unit 67) attached to its body is also performed. For example, image output, light flashing, or sound output is performed by a display device, an LED, or a speaker of the specified apparatus, respectively. Accordingly, since a user can visually check this operation performed by the device attached to the body of the apparatus in front of him or her, he or she can determine whether the desired apparatus has been correctly specified.

A procedure for specifying an apparatus to be controlled and confirming the specified apparatus to be controlled is as follows: (1) the IP remote controller transmits a command for specifying an apparatus to be controlled to an apparatus to be specified via a network; (2) the apparatus having received the command transmits a response to the IP remote controller via the network and performs a response operation that depends on the device attached to its body such as displaying of an icon showing that it has been specified as an apparatus to be controlled, flashing of an LED attached to the panel of its body, beep sound generation, or vibration of its body; and (3) a user in front of the apparatus detects the response operation. Conversely, if the user is not in front of the apparatus, he or she cannot detect the response operation. Thus a user can actually determine whether the desired apparatus has been correctly specified.

Figure 5:
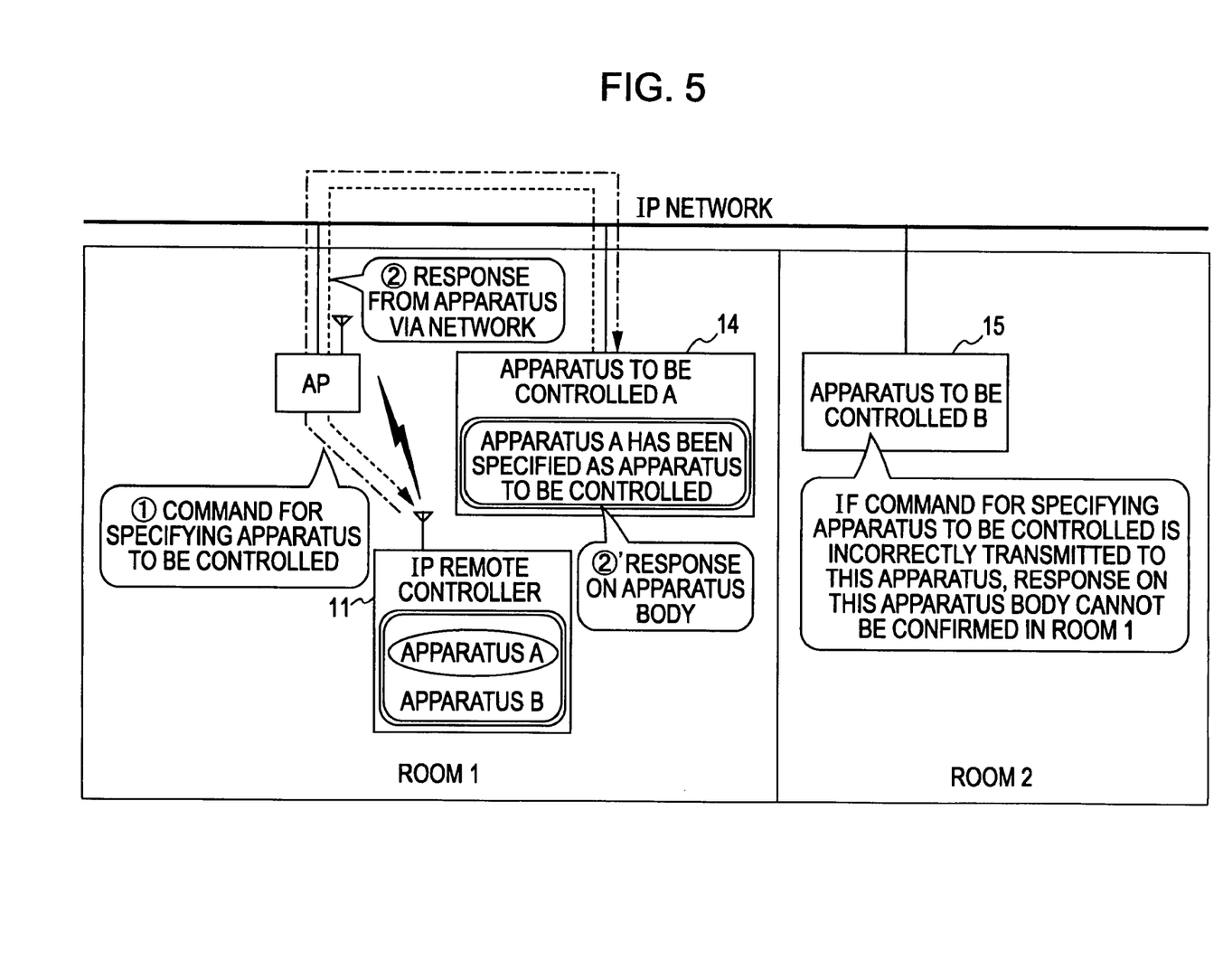
FIG. 5 is a diagram showing a procedure for specifying an apparatus to be controlled and confirming the specified apparatus to be controlled in a remote control system according to an embodiment of the present invention.

A procedure for specifying an apparatus to be controlled and confirming the specified apparatus to be controlled in the remote control system according to this embodiment will be described with reference to FIG. 5.

Apparatuses to be controlled A and B disposed in rooms 1 and 2, respectively, are connected to each other via a network. In this case, the IP remote controller can specify both apparatuses to be controlled A and B via a home network.

When a user having the IP remote controller is in the room 1 and wants to specify the apparatus to be controlled A as an apparatus to be controlled, a command for specifying an apparatus to be controlled is transmitted from the IP remote controller to the apparatus to be controlled A via the network.

The apparatus to be controlled A transmits a response via the network in response to the command. In addition, the apparatus to be controlled A gives a reaction together with an operation using the operation unit 67, thereby causing the user to confirm that it has been specified. More specifically, an icon or message showing that the apparatus has been specified as an apparatus to be controlled is shown on a display or a display unit attached to the panel of the apparatus body. Alternatively, a beep sound or a voice message is output.

When the command for specifying an apparatus to be controlled is incorrectly transmitted from the IP remote controller to the apparatus to be controlled B, the apparatus to be controlled B gives a reaction together with an operation (same as above) in response to the command. In this case, the user in the room 1 cannot directly confirm the reaction by the apparatus to be controlled B, for example, in a visual observation manner. Moreover, the apparatus to be controlled A, which is disposed in the same room where the user exists and which the user believes that he or she has specified, does not give a reaction. Since this causes the user to notice that he or she has failed to specify the apparatus to be controlled A, the user can specify the apparatus to be controlled A again so that the command for specifying an apparatus to be controlled can be transmitted to the apparatus.

Figure 6:
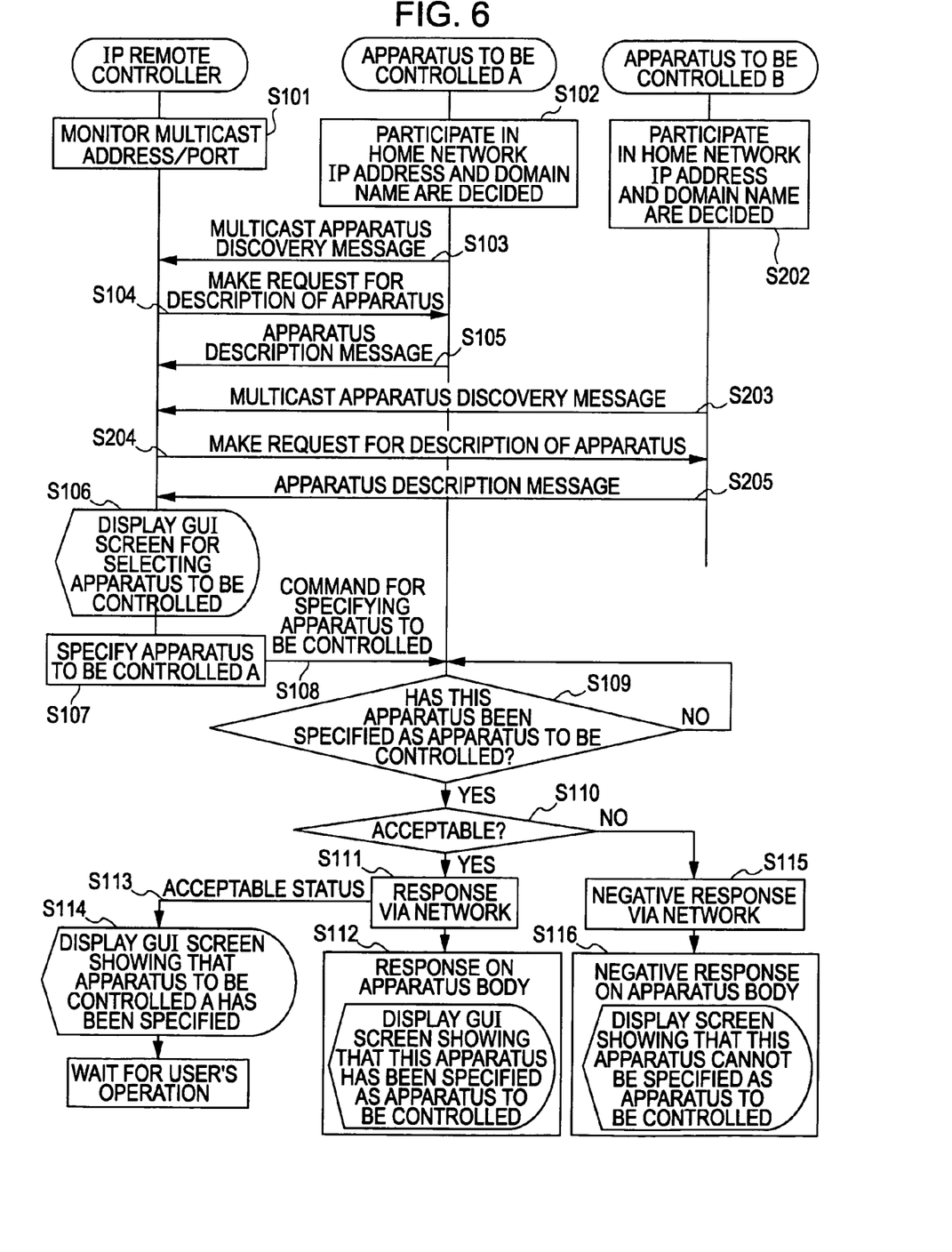
FIG. 6 is a diagram showing an operating sequence of specifying an apparatus to be controlled and confirming the specified apparatus to be controlled.

FIG. 6 is a diagram showing an operating sequence of specifying an apparatus to be controlled and confirming the specified apparatus to be controlled. Here, it is assumed that the apparatuses to be controlled A and B exist inside and outside a user's visual range, respectively. Moreover, it is also assumed that the apparatuses to be controlled A and B are compliant with UPnP (Universal Plug and Play), and the IP remote controller corresponds to a UPnP control point. UPnP is a protocol allowing apparatuses such as a PC, a peripheral, an AV apparatus, a phone, and a home appliance to be connected to each other and provide a function of each apparatus to each other.

The IP remote controller 11, which corresponds to a UPnP control point, is connected to the home network 10 and periodically monitors a multicast address/port in order to monitor the connection status of each UPnP apparatus on the home network 10 (S101).

When the apparatuses to be controlled A and B compliant with UPnP are connected to the home network 10, DHCP (Dynamic Host Configuration Protocol) and DNS (Domain Name System) server functions of the router 13 operate, so that an IP address and a domain name are given to each of the apparatuses to be controlled A and B (S102 and S202).

Upon receiving the IP address and the domain name, each of the apparatuses to be controlled A and B multicasts an apparatus discovery message that includes an apparatus ID and the domain name in accordance with a UPnP apparatus discovery protocol (S103 and S203).

The IP remote controller 11 can specify each of the apparatuses to be controlled A and B using the apparatus ID and the domain name included in the received apparatus discovery message. In order to acquire more detailed information on these apparatuses, the IP remote controller 11 requests each of the apparatuses to be controlled A and B for detailed description of the apparatus (S104 and S204).

Each of the apparatuses to be controlled A and B transmits an apparatus description message in response to the apparatus description request having been received from the IP remote controller 11 (S105 and S205). The IP remote controller 11 can acquire a manufacturer's name, an apparatus name, and a model number of each of the apparatuses to be controlled A and B from this message.

According to the above-described process, the IP remote controller 11 can separately specify the apparatuses to be controlled A and B and control these apparatuses via the network.

Here, a GUI screen for selecting an apparatus to be controlled is displayed on the liquid crystal display unit 39 that doubles as a touch panel of the IP remote controller 11 by a user's operation (S106). When the user selects the apparatus to be controlled A and then presses a GUI button corresponding to the selected apparatus (S107), a command for specifying an apparatus to be controlled is transmitted to the apparatus to be controlled A via the home network 10 (S108).

The apparatus to be controlled A periodically monitors itself so as to know whether it has been specified as an apparatus to be controlled (S109). Upon receiving the command for specifying an apparatus to be controlled from the IP remote controller 11, the apparatus to be controlled A checks its current operating status and then determines whether it can be under the control of the IP remote controller 11 (S110).

When the apparatus to be controlled A determines that it can be under the control of the IP remote controller 11, it transmits a status showing that the command is acceptable to the IP remote controller via the home network 10. At the same time, the apparatus to be controlled A gives a reaction by performing an operation using the operation unit 67, thereby causing a user to confirm that it has been specified. When the apparatus to be controlled A is a television receiver (or an apparatus provided with a monitor display), for example, an icon or a message indicating that the apparatus has been specified is shown on its display.

On the other hand, referring back to the determination block S110, when the apparatus to be controlled A determines that it cannot receive the command for specifying an apparatus to be controlled having been transmitted by the IP remote controller 11, it transmits an error status showing that the command is unacceptable. At the same time, the apparatus to be controlled A displays the reason for not being able to receive the command, etc. on its display.

As an operation performed by an apparatus to be remotely controlled in response to a selection operation having been performed by the IP remote controller, presentation of meaningful information such as the user-friendly default or user-set name that a user has provided to each apparatus may be performed instead of the reaction such as LED flashing and beep sound generation from a speaker.

In this case, on the side of the IP remote controller, a user specifies an apparatus to be remotely controlled via a GUI selection screen on which a list of name information about each apparatus controllable via a network is shown. In response to the user's specifying operation, on the side of the apparatus to be remotely controlled, name information thereof is displayed as an operation. Accordingly, the user can compare the apparatus name that he or she has selected on the GUI selection screen to the apparatus name displayed on the screen of the specified apparatus to be remotely controlled on the basis of the contents of both screens. The user-set name means a mnemonic name that a user can freely give to an apparatus. The user-friendly default name means a mnemonic name that a system automatically assigns to an apparatus considering where the apparatus is placed in a house. The user-friendly default name can be uniquely handled as distinguished from IP and MAC addresses in a home network. In particular, when an easy-to-understand user-set name is used as the name information, the display of the user-set name is more acceptable for users compared with the reaction such as LED indication or beep sound generation. In addition, this leads to a more understandable system for users.

Figure 7:
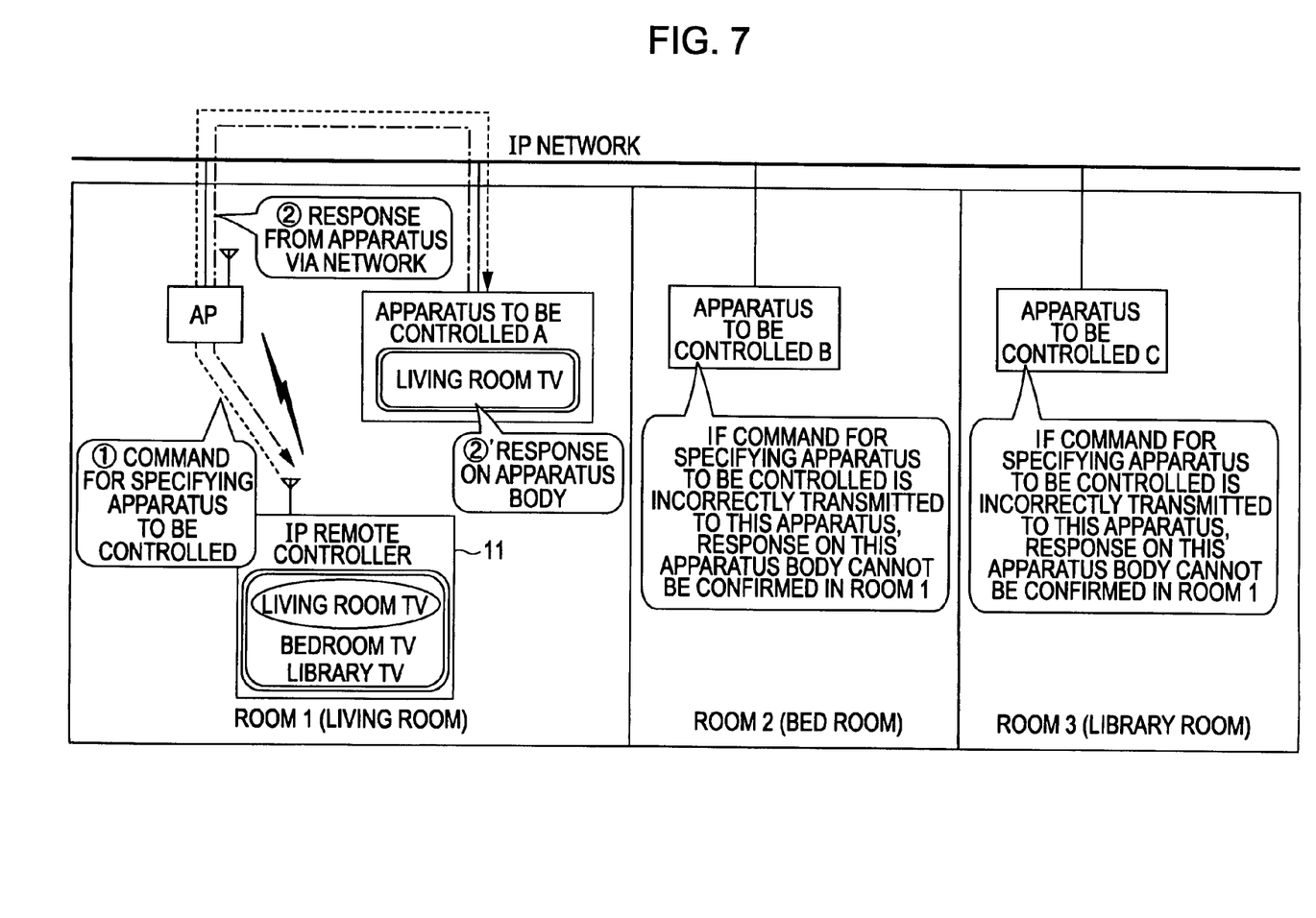
FIG. 7 is a diagram showing a procedure for specifying an apparatus to be controlled using a user-set name and confirming the specified apparatus to be controlled in a remote control system according to an embodiment of the present invention.

FIG. 7 is a diagram showing a procedure for specifying an apparatus to be controlled using a user-set name and confirming the specified apparatus to be controlled in a remote control system according to this embodiment.

Apparatuses to be controlled A, B, and C disposed in a room 1 (a living room), a room 2 (a bed room), and a room 3 (a library), respectively, are connected to each other via a network. The IP remote controller can specify the apparatuses to be controlled A, B, and C from an access point (AP) through a home network.

Here, it is assumed that each of the apparatuses to be controlled A, B, and C is a television receiver or an apparatus provided with a display. Moreover, it is also assumed that the user-set names of "living room TV", "bed room TV", and "library TV", from which a user can understand where each of these apparatuses is disposed, are registered for the apparatuses to be controlled A, B, and C, respectively. User-friendly default names acquired from the individual apparatuses to be controlled A, B, and C may be used instead of the user-set names.

Either the IP remote controller or the access point between the IP remote controller and an apparatus to be controlled has a table of a user-set or user-friendly default name, and network identification information such as the IP or MAC address having been assigned to each apparatus. In the case where the IP remote controller has the table, the IP remote controller converts a user-set name having been specified on the screen thereof into an IP address so that an apparatus to be controlled can be specified by means of an IP address and then transmits a message with the IP address via the access point. In the case where the access point has the table, the IP remote controller transmits a message with a user-set name. Subsequently, the access point converts the user-set name included in the received message into a user-friendly default name (or network identification information such as an IP address) and then transfers the message with the user-friendly default name to the IP network. In the following description, it will be assumed for convenience that the IP remote controller has the table of the user-set name.

TABLE 1

| network identifier | user-friendly default name | user-set name |
| --- | --- | --- |
| identifier A | display apparatus A | living room TV |
| identifier B | display apparatus B | bedroom TV |

A user having the IP remote controller is in the room 1 (a living room). The IP remote controller can control the apparatuses to be controlled A, B, and C. A selection GUI screen having a list of user-set names (or user-friendly default names) of these apparatuses is shown on the display of the IP remote controller.

The user knows that he or she is in a living room and wants to select a television receiver in front of him or her, namely, the apparatus to be controlled A, from among three apparatuses to be controlled and then activate the selected television receiver. Therefore, the user selects the user-set name "living room TV" that reminds him or her that the TV is disposed in a living room on the selection GUI screen. In response to this user's selection, a command for specifying an apparatus to be controlled is transmitted from the IP remote controller to the apparatus to be controlled A via a network. The command includes a request for displaying a user-set name.

The apparatus to be controlled A gives a reaction by displaying its user-set name on the screen thereof in response to the received command. The user can easily compare the user-set name that he or she has selected on the GUI selection screen to the user-set name displayed on the screen of the apparatus to be controlled A on the basis of the contents of both screens.

On the other hand, when the user incorrectly selects "bedroom TV" on the selection GUI screen, a command for specifying an apparatus to be controlled is transmitted to the apparatus to be controlled B. The command includes a request for displaying a user-set name. In the room 2 (a bedroom), the apparatus to be controlled B displays its user-set name in response to the command. In this case, the user in the room 1 cannot directly confirm the operation performed by the apparatus to be controlled B, for example, in a visual observation manner. Moreover, the apparatus to be controlled A, which is disposed in the same room where the user exists and which the user believes that he or she has specified, does not give a reaction. Since this causes the user to notice that he or she has failed to specify the apparatus to be controlled A, the user can specify the apparatus to be controlled A again so that the command for specifying an apparatus to be controlled can be transmitted to the apparatus.

FIG. 8 is a diagram showing an operating sequence of specifying an apparatus to be controlled using a user-friendly default or user-set name and confirming the specified apparatus to be controlled. Here, it is assumed that the apparatuses to be controlled A and B are disposed inside and outside the visual range of a user that has the IP remote controller, respectively. Moreover, it is also assumed that apparatuses to be controlled A and B are compliant with UPnP, and the IP remote controller corresponds to a UPnP control point (same as above).

The IP remote controller, which corresponds to a UPnP control point, is connected to the home network 10 and periodically monitors a multicast address/port in order to monitor the connection status of each UPnP apparatus on the home network 10 (S301).

When the apparatuses to be controlled A and B compliant with UPnP are connected to the home network 10, DHCP (Dynamic Host Configuration Protocol) and DNS (Domain Name System) server functions of a router operate, so that an IP address and a domain name are given to each of the apparatuses to be controlled A and B (S302 and S402).

Upon receiving the IP address and the domain name, each of the apparatuses to be controlled A and B multicasts an apparatus discovery message that includes an apparatus ID and the domain name in accordance with a UPnP apparatus discovery protocol (S303 and S403)

The IP remote controller can specify each of the apparatuses to be controlled A and B using the apparatus ID and the domain name included in the received apparatus discovery message. In order to acquire more detailed information on these apparatuses, the IP remote controller requests each of the apparatuses to be controlled A and B for detailed description of the apparatus (S304 and S404).

Each of the apparatuses to be controlled A and B transmits an apparatus description message in response to the apparatus description request having been received from the IP remote controller (S305 and S405). The IP remote controller can acquire a manufacturer's name, an apparatus name, and a user-friendly default name of each of the apparatuses to be controlled A and B from this message.

According to the above-described process, the IP remote controller can separately specify the apparatuses to be controlled A and B and control these apparatuses via the network. It is assumed for convenience that the apparatuses to be controlled A and B are typically under the control of the IP remote controller. Therefore these apparatuses may not perform checking operations of their current operating statuses (step S110 in FIG. 6) in response to the command from the IP remote controller.

Here, a GUI screen for selecting an apparatus to be controlled is displayed on the liquid crystal display unit 39 that doubles as a touch panel of the IP remote controller 11 by a user's operation. At this time, the user can select a method of specifying an apparatus to be controlled by means of either a user-friendly default name or a user-set name (S306).

When the user specifies a method that uses a user-friendly default name, a GUI selection screen on which user-friendly default names of apparatuses currently controllable via the network are listed is displayed (S307). When the user selects the user-friendly default name of the apparatus to be controlled A, for example, a command for specifying an apparatus to be controlled is transmitted to the apparatus to be controlled A in response to the user's selection operation (S309). The command includes a request for displaying a user-friendly default name. The apparatus to be controlled A displays its user-friendly default name on the screen thereof in response to the received command.

On the other hand, when the user specifies a method that uses a user-set name, a GUI selection screen on which user-set names of apparatuses currently controllable via the network are listed is displayed (S308). When the user selects the user-set name of the apparatus to be controlled B, for example, a command for specifying an apparatus to be controlled is transmitted to the apparatus to be controlled B in response to the user's selection operation (S310). The command includes a request for displaying a user-set name. The apparatus to be controlled B displays its user-set name on the screen thereof in response to the received command.

As described above, a user can specify an apparatus to be controlled via the GUI selection screen of the IP remote controller, where user-friendly default or user-set names are listed. On the side of an apparatus to be remotely operated that has received the command for specifying an apparatus to be controlled, a displaying operation of the user-friendly default or user-set name of the apparatus is performed as an operation. Consequently, the user can compare the apparatus name that he or she has selected on the GUI selection screen to the apparatus name displayed on the screen of the actually specified apparatus to be remotely controlled on the basis of the contents of both screens. In particular, when the easy-to-understand user-set name is used, the display of the user-set name is more acceptable and understandable for users compared with the reaction of LED indication or beep sound generation.

The present invention has been described in detail above with reference to the specific embodiment. However, it is obvious that modifications and substitutions of the embodiment can be made by those skilled in the art without departing from the scope of the present invention. That is, the present invention has been disclosed in conjunction with the examples, and the contents of the specification should not be restrictively interpreted. The scope of the present invention should be interpreted in consideration of the scope of the appended claims.

What is claimed is:

1. A remote control system in which, when apparatuses controllable via a network exist inside and outside a user's visual range, a user remotely controls at least one of the apparatuses via the network using a predetermined control point, the remote control system comprising:

means for causing the control point to transmit a command for specifying an apparatus to be controlled via the network to an apparatus to be specified in accordance with a user's apparatus specifying operation; and means for causing the apparatus that has received the command for specifying an apparatus to be controlled to transmit a response via the network to the control point as well as to perform an operation using a device attached to the body of the apparatus in response to the command, the control point displaying a list of name information of all apparatuses controllable via the network, and then transmitting the command for specifying an apparatus to be controlled to an apparatus to be specified via the network in accordance with the apparatus specifying operation performed by the user using the displayed list, the command including a request for displaying name information of the apparatus to be specified, and the apparatus that has received the command for specifying an apparatus to be controlled performing a displaying operation of the name information thereof as the operation in response to the command.

2. The remote control system according to claim 1, wherein the control point informs a user that the apparatus specifying operation has been completed upon receiving the response to the command for specifying an apparatus to be controlled.

3. The remote control system according to claim 1, wherein the apparatus that has received the command for specifying an apparatus to be controlled performs an operation such as causing an image to be output from a display device attached to the body of the apparatus, flashing an LED, or outputting sound from a speaker in response to the command.

4. The remote control system according to claim 1, wherein the apparatus that has received the command for specifying an apparatus to be controlled determines whether it can accept the command and then informs a user of the determined result by displaying the determined result on the body of the apparatus.

5. The remote control system according to claim 1, wherein the control point functions as a remote commander.

6. A remote commander that operates as a control point for controlling via a network at least one of one or more apparatuses that are controllable via the network and are connected to each other via the network, the at least one of one or more apparatuses having been specified as an apparatus to be controlled by a user, the remote commander comprising:

means for informing a user of the one or more apparatuses controllable via the network;

means for specifying an apparatus by transmitting a command for specifying an apparatus via the network to an apparatus that a user has specified from among the one or more apparatuses that the user has been informed of; and means for informing a user that an apparatus specifying operation has been completed upon receiving a receipt confirmation response via the network from an apparatus that has received the command for specifying an apparatus, the receipt confirmation response showing that the apparatus has accepted the command, the means for informing a user of the one or more apparatuses displaying a list of name information of all apparatuses controllable via the network, and the means for specifying an apparatus transmitting the command for specifying an apparatus to be controlled via the network to an apparatus that the user has specified using the displayed list, the command including a request for displaying the name information of the apparatus to be specified.

7. A remote control operation method of remotely controlling via a network at least one of one or more apparatuses that are controllable via the network and are connected to each other via the network, the at least one of one or more apparatuses having been specified as an apparatus to be controlled by a user, the remote control operation method comprising:

informing a user of the one or more apparatuses controllable via the network;

displaying a list of name information of all apparatuses controllable via the network;

specifying an apparatus by transmitting a command for specifying an apparatus via the network to an apparatus that a user has specified from among the one or more apparatuses that the user has been informed of;

transmitting a command for specifying an apparatus to be controlled via the network to an apparatus that the user has specified using the displayed list, the command including a request for displaying the name information of the apparatus to be specified; and informing a user that an apparatus specifying operation has been completed upon receiving a receipt confirmation response via the network from an apparatus that has received the command for specifying an apparatus, the receipt confirmation response showing that the apparatus has accepted the command.

8. An apparatus to be remotely controlled that a user can remotely operate using a control point via a network, the apparatus to be remotely controlled comprising:

means for performing a communicating operation via the network;

means for transmitting a reception confirmation response via the network when the apparatus to be remotely controlled accepts a command for specifying an apparatus to be controlled having been received from the control point via the network; and means for performing an operation when the apparatus to be remotely controlled accepts a command for specifying an apparatus to be controlled having been received from the control point via the network, the operation showing that the apparatus to be remotely controlled has accepted the command, the means being attached to the body of the apparatus, and the means for performing an operation displaying the name information of the apparatus as the operation when the command for specifying the apparatus to be controlled is received by the apparatus, the command including a request for displaying name information.

9. The apparatus to be remotely controlled according to claim 8, wherein the means for performing an operation performs an operation such as causing an image to be output from a display device attached to the body of the apparatus, flashing an LED, or outputting sound from a speaker in response to the command for specifying an apparatus to be controlled.

10. The apparatus to be remotely controlled according to claim 8, further comprising:

means for determining whether the apparatus to be remotely controlled can accept a command for specifying an apparatus to be controlled, the command having been received from the control point via the network, and for informing a user of the determined result on the body of the apparatus.

11. A non-transitory computer readable medium encoded with a computer program written in a computer-readable form so that a method for remotely operating via a network at least one of one or more apparatuses that are controllable via the network and are connected to each other via the network can be performed on a computer system, the at least one of one or more apparatuses having been specified as an apparatus to be controlled by a user, the method comprising:

informing a user of the one or more apparatuses controllable via the network;

displaying a list of name information of all apparatuses controllable via the network;

specifying an apparatus by transmitting a command for specifying an apparatus via the network to an apparatus that a user has specified from among the one or more apparatuses that the user has been informed of;

transmitting a command for specifying an apparatus to be controlled via the network to an apparatus that the user has specified using the displayed list, the command including a request for displaying the name information of the apparatus to be specified; and informing a user that an apparatus specifying operation has been completed upon receiving a reception confirmation response via the network from an apparatus to which the command for specifying an apparatus has been transmitted, the reception confirmation response showing that the apparatus has accepted the command.

12. A remote control system in which, when apparatuses controllable via a network exist inside and outside a user's visual range, a user remotely controls at least one of the apparatuses via the network using a predetermined control point, the remote control system comprising:

a first transmitter configured to transmit a command for specifying an apparatus to be controlled via the network to an apparatus to be specified in accordance with a user's apparatus specifying operation; and a second transmitter configured to transmit a response via the network to the control point as well as to perform an operation using a device attached to the body of the apparatus in response to the command, the control point configured to display a list of name information of all apparatuses controllable via the network, and then to transmit the command for specifying an apparatus to be controlled to an apparatus to be specified via the network in accordance with the apparatus specifying operation performed by the user using the displayed list, the command including a request for displaying name information of the apparatus to be specified, and the apparatus that has received the command for specifying an apparatus to be controlled performing a displaying operation of the name information thereof as the operation in response to the command.

13. A remote commander that operates as a control point for controlling via a network at least one of one or more apparatuses that are controllable via the network and are connected to each other via the network, the at least one of one or more apparatuses having been specified as an apparatus to be controlled by a user, the remote commander comprising:

a display configured a to inform a user of the one or more apparatuses controllable via the network, the display configured to display a list of name information of all apparatuses controllable via the network; and a transmitter configured to specify an apparatus by transmitting a command for specifying an apparatus via the network to an apparatus that a user has specified from among the one or more apparatuses that the user has been informed of, the transmitter configured to transmit the command for specifying the apparatus to be controlled via the network to the apparatus that the user has specified using the displayed list, the command including a request for displaying the name information of the apparatus to be specified, the display further configured to inform a user that an apparatus specifying operation has been completed upon receiving a receipt confirmation response via the network from an apparatus that has received the command for specifying an apparatus, the receipt confirmation response showing that the apparatus has accepted the command.

14. An apparatus to be remotely controlled that a user can remotely operate using a control point via a network, the apparatus to be remotely controlled comprising:

a communicator configured to perform a communicating operation via the network;

a transmitter configured to transmit a reception confirmation response via the network when the apparatus to be remotely controlled accepts a command for specifying an apparatus to be controlled having been received from the control point via the network; and a controller configured to perform an operation when the apparatus to be remotely controlled accepts a command for specifying an apparatus to be controlled having been received from the control point via the network, the operation showing that the apparatus to be remotely controlled has accepted the command, the controller being attached to the apparatus body, and controller configured to display the name information of the apparatus as the operation when the command for specifying the apparatus to be controlled is received by the apparatus, the command including a request for displaying name information.

* * * * *